(12) United States Patent
Ishii et al.

(10) Patent No.: US 7,549,584 B2
(45) Date of Patent: Jun. 23, 2009

(54) APPARATUS FOR OPTICALLY READING IDENTIFICATION INFORMATION FROM COMMODITY

(75) Inventors: Mitsuharu Ishii, Inagi (JP); Masanori Ohkawa, Inagi (JP); Shunji Shimada, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 0 days.

(21) Appl. No.: 11/359,493

(22) Filed: Feb. 23, 2006

(65) Prior Publication Data

US 2007/0119946 A1 May 31, 2007

(30) Foreign Application Priority Data

Nov. 30, 2005 (JP) ............................. 2005-345881

(51) Int. Cl.
*G06K 7/10* (2006.01)

(52) U.S. Cl. .................... 235/462.36; 235/472.01; 235/462.25

(58) Field of Classification Search ................
235/462.01–462.45, 454, 472.01, 472.02, 235/472.03
See application file for complete search history.

(56) References Cited

U.S. PATENT DOCUMENTS

| 4,450,350 | A | * | 5/1984 | Hardy | 235/462.4 |
|---|---|---|---|---|---|
| 4,575,625 | A | * | 3/1986 | Knowles | 235/462.3 |
| 4,870,274 | A | * | 9/1989 | Hebert et al. | 250/236 |
| 4,939,356 | A | * | 7/1990 | Rando et al. | 235/462.2 |
| 4,971,410 | A | * | 11/1990 | Wike et al. | 359/17 |
| 5,017,765 | A | * | 5/1991 | Shepard et al. | 235/462.27 |
| 5,392,150 | A | * | 2/1995 | Inagaki et al. | 359/221 |
| 6,460,767 | B1 | * | 10/2002 | Knowles et al. | 235/462.37 |
| 6,783,074 | B1 | * | 8/2004 | Hammer | 235/462.4 |
| 6,883,712 | B1 | * | 4/2005 | Hammer et al. | 235/462.32 |
| 6,935,566 | B1 | * | 8/2005 | Mulla et al. | 235/472.01 |
| 7,204,424 | B2 | * | 4/2007 | Yavid et al. | 235/462.32 |
| 2001/0038038 | A1 | * | 11/2001 | Rando et al. | 235/462.45 |
| 2006/0016892 | A1 | * | 1/2006 | Vinogradov et al. | 235/454 |
| 2007/0295817 | A1 | * | 12/2007 | Massieu et al. | 235/462.23 |
| 2008/0277471 | A1 | * | 11/2008 | Mashiko | 235/462.01 |

FOREIGN PATENT DOCUMENTS

| JP | 6-76095 | 3/1994 |
|---|---|---|
| JP | 6-251179 | 9/1994 |
| JP | 6-337951 | 12/1994 |
| JP | 9-167198 | 6/1997 |
| JP | 11-109272 | 4/1999 |

* cited by examiner

*Primary Examiner*—Thien M Le
(74) *Attorney, Agent, or Firm*—Westerman, Hattori, Daniels & Adrian, LLP.

(57) ABSTRACT

A reading apparatus reads identification information attached on an object located outside of the reading apparatus by optically scanning a surface of the object. The reading apparatus includes a supporting member that supports a optical deflecting unit and that rotatably supports a light collecting unit.

20 Claims, 5 Drawing Sheets

APPARATUS FOR OPTICALLY READING IDENTIFICATION INFORMATION FROM COMMODITY

BACKGROUND OF THE INVENTION

1. Field of the Invention

The present invention relates to a technology for optically scanning a surface of a commodity to read identification information attached to the surface of the commodity.

2. Description of the Related Art

In recent years, in distribution markets including supermarkets and department stores, it has been a widely-used practice to read barcodes attached to commodities using barcode readers for the checkout process and the management of the commodities.

With these barcode readers, the reading of barcodes are performed by irradiating a light beam such as a laser beam toward each barcode so as to scan the barcode surface and detecting the laser beam reflected by the barcode.

Generally speaking, a barcode reader uses a laser light source such as a semiconductor laser as the light source and scans a laser beam emitted from the laser light source by having the laser beam reflected by a rotating polygon mirror. The polygon mirror is a rotating member that has a set of flat-surface reflection faces on its periphery. It is possible to generate the scan beam by irradiating the light beam such as the laser beam onto the rotating polygon mirror. In the barcode reader, the scan beam generated this way is divided, using mirrors that are tilted at a plurality of mutually different angles, and emitted to the outside of the barcode reader through a reading window so as to be irradiated onto a barcode attached to a commodity, or the like.

The light beam reflected by the barcode becomes incident to the barcode reader through the reading window and then becomes incident to the polygon mirror by following the same path as the emission path. Because the reflection beams have been reflected diffusely, the barcode reader collects the reflection beams using a concave mirror, a transmission lens, or the like, so as to introduce the reflection beams to an optical detector. For example, see the Japanese Unexamined Patent Application Publication No. H11-109272.

FIGS. 5A and 5B are drawings for explaining conventional barcode readers. In the example shown in FIG. 5A, a laser light source 1 is disposed at an upper section of a barcode reader. In this arrangement, a laser beam emitted from the laser light source 1 goes through a through hole in a concave mirror 4 and becomes incident to the polygon mirror 2 so as to be scanned and emitted to the outside of the barcode reader. The light beam is then reflected by a barcode attached to a commodity, and follows the same path as the one used when being emitted outward before being reflected by the polygon mirror. After being collected by the concave mirror 4, the light beam becomes incident to an optical detector 3.

In the example shown in FIG. 5B, a laser light source is disposed at a lower section of a barcode reader. In this arrangement, the laser beam emitted from the laser light source 1 is deflected when being reflected by the laser beam deflecting mirror 5, and becomes incident to the polygon mirror 2. The laser beam is then scanned by the polygon mirror 2 and emitted to the outside of the barcode reader. Subsequently, the light beams reflected by a barcode attached to a commodity or the like are collected by the transmission lens 6 so as to become incident to the optical detector 3.

As described here, various arrangements and configurations are available for optical systems in barcode readers. To determine which ones of these arrangements and configurations are to be used, it is necessary to consider how to enhance the level of the reading performances of the barcode reader.

However, as in the barcode reader shown in FIG. 5A, when the laser beam emitted from the laser light source is directly incident to the polygon mirror, because the concave mirror is positioned between the laser light source and the polygon mirror, the dimension of the laser beam being incident to the polygon mirror is large in the path direction. As a result, the apparatus becomes large.

Normally, when being used in a supermarket or the like, because barcode readers are positioned between sales clerks and consumers, there is a demand for barcode readers that are small in size so that the sales clerks and the consumers are able to communicate with one another smoothly. In addition, it is more convenient to use barcode readers in a smaller size in order to prevent commodities and shopping baskets from getting in the way when they are moved around near barcode readers.

On the contrary, as in the barcode reader shown in FIG. 5B, when the laser beam emitted from the laser light source is incident to the polygon mirror after being deflected by the laser beam deflecting mirror, it is possible to dispose the laser light source and the polygon mirror on the same side with respect to the transmission lens. It is therefore possible to reduce the dimension of the laser beam being incident to the polygon mirror in the path direction, and to make the apparatus smaller. With this configuration, however, because the laser beam deflecting mirror is positioned between the transmission lens and the polygon mirror, part of the light beam being incident to the transmission lens is interrupted by the laser beam deflecting mirror. Thus, there is a problem that the amount of signal light reaching the optical detector becomes small, and the level of the reading performance of the barcode reader is lowered.

SUMMARY OF THE INVENTION

It is an object of the present invention to at least solve the problems in the conventional technology.

According to an aspect of the present invention, a reading apparatus that reads identification information attached on an object located outside of the reading apparatus by optically scanning a surface of the object, includes a light source configured to output a light beam; an optical deflecting unit configured to deflect the light beam; an optical scanning unit that receives the light beam from the optical deflecting unit, produces a scan beam from light beam, and emits the scan beam toward the object; a light collecting unit that collects a reflection beam that is a light reflected from the surface of the object; a supporting member that supports the optical deflecting unit and that rotatably supports the light collecting unit; and an optical detecting unit that receives the reflection beam from the light collecting unit so as to detect a barcode attached to the surface of the object.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments of the present invention will be explained with reference to the accompanied drawings.

Figure 1:
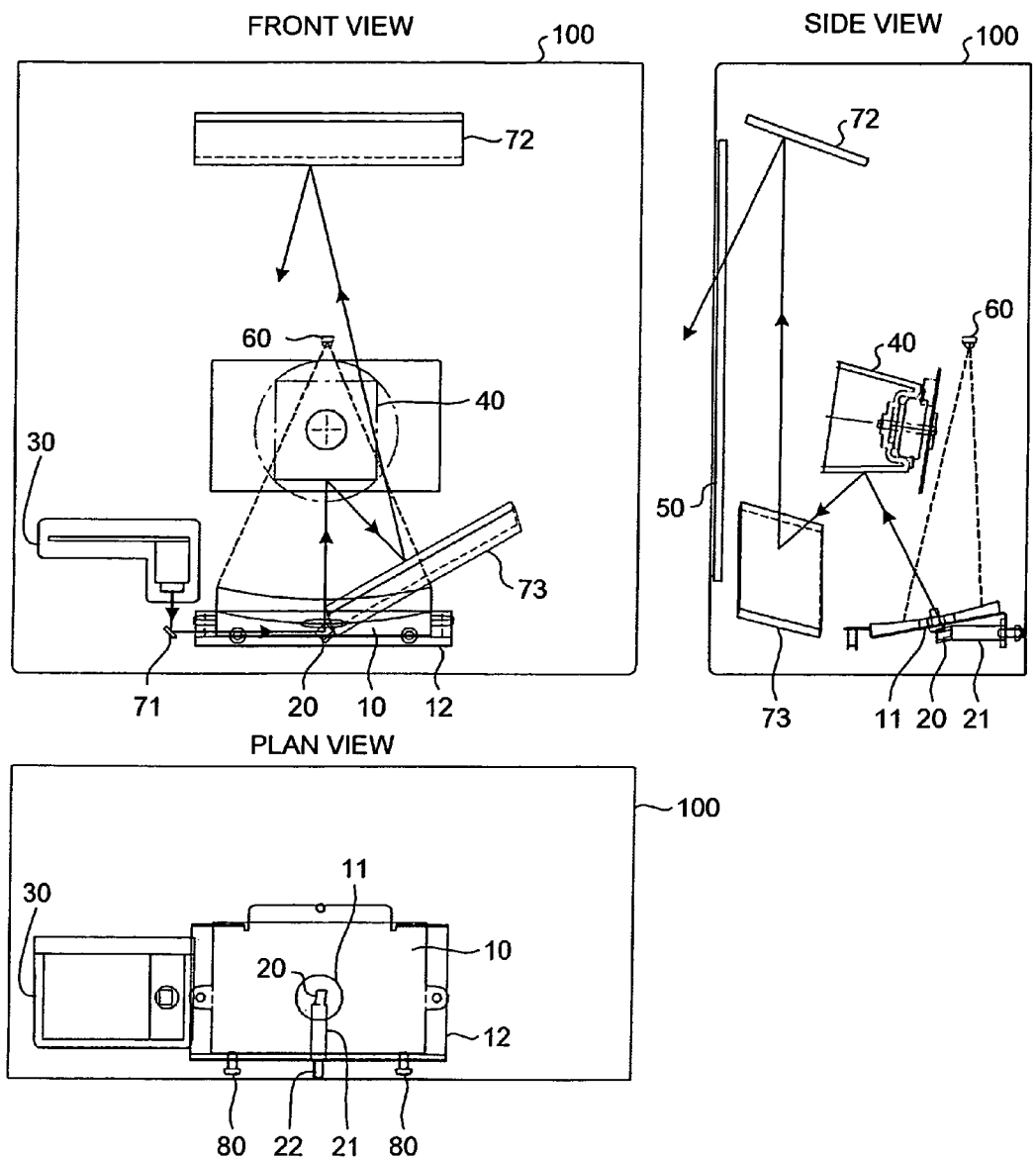
FIG. 1 is a drawing of a barcode reader according to an embodiment of the present invention.

Firstly, a configuration of a barcode reader according to an embodiment of the present invention will be explained below. FIG. 1 is a drawing of a barcode reader according to the embodiment. The barcode reader 100 includes a laser light source and reads identification information recorded in a barcode by generating a scan beam based on a laser beam emitted from the laser light source, irradiating the generated scan beam onto a barcode attached to an item, and detecting reflection beams reflected by the barcode as a result of the irradiation.

FIG. 1 includes a front view, a side view, and a plan view of the barcode reader 100. The casing of the barcode reader 100 has a reading window 50 on the viewer side of the front view (i.e. on the left side of the side view). The barcode reader 100 emits a laser beam through the reading window 50 and scans the laser beam onto a barcode attached to an item passing near the reading window 50. Reflection beams reflected by the barcode then become incident to the barcode reader 100 through the same reading window 50.

Inside the casing, the barcode reader 100 includes a mirror system 73 whose reflection face is tilted toward the direction of the center of the barcode reader 100, a mirror system 72 whose reflection face is tilted toward the direction of the reading window 50, and a small mirror 71 whose reflection face is tilted toward the direction of the center of the barcode reader 100.

In addition, as shown in the front view in the drawing, a laser light source module 30 is included in the barcode reader 100 and is positioned near the bottom on the left side of the drawing. The laser light source module 30 is a light source that generates a laser beam and emits the laser beam toward the lower side of the drawing.

The traveling path of the laser beam emitted by the laser light source module 30 is changed toward the right side of the drawing by the mirror 71 and becomes incident to the laser beam deflecting mirror 20 positioned near the center on the lower side of the drawing.

The laser beam deflecting mirror 20 reflects the laser beam being incident thereto due to the mirror 71 toward the upper side of the drawing so as to introduce the laser beam to a polygon mirror 40 positioned near the center of the drawing. The polygon mirror 40 will be explained later.

Figure 2:
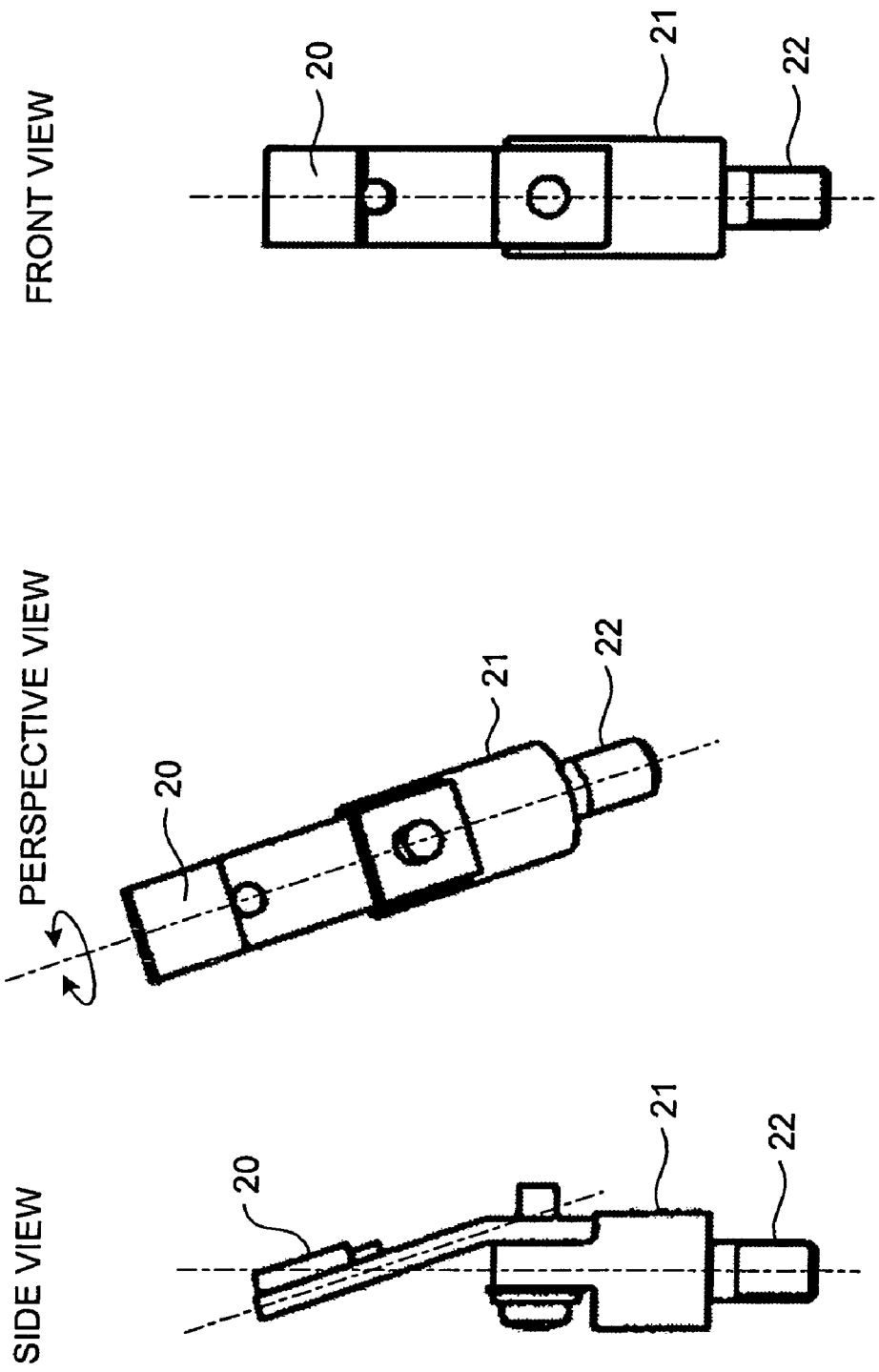
FIG. 2 is a drawing of a laser beam deflecting mirror shown in FIG. 1.

FIG. 2 is a drawing of the laser beam deflecting mirror 20. FIG. 2 includes a front view, a side view, and a perspective view of the laser beam deflecting mirror 20. The laser beam deflecting mirror 20 is supported by a supporting member 21, which is in the shape of a cylindrical column, and is fixed to an end of the supporting member 21 so as to be tilted at a predetermined angle with respect to the central axis of the supporting member 21. The other end of the supporting member 21, which is the end opposite to the one having the laser beam deflecting mirror 20, has a screw portion 22 treated with a screw thread processing. Together with a concave mirror 10, which is to be described later, the laser beam deflecting mirror 20 is fixed to the casing of the barcode reader 100 by the screw portion 22 on the supporting member 21.

By rotating the supporting member 21, it is possible to adjust the laser beam deflecting mirror 20 so as to be tilted by a predetermined angle with respect to the optical axis of the laser beam introduced to the polygon mirror 40 by the laser beam deflecting mirror 20. Thus, it is possible to adjust the focal point of the laser beam and to correct, within the barcode reader 100, an error that may occur during the assembly process of the optical system.

In addition, because the supporting member 21 is fixed to the casing of the barcode reader 100 by the screw portion 22, it is possible to maintain the focal point of the laser beam at a predetermined position.

With reference to the front view in FIG. 1 again, the laser beam reflected by the laser beam deflecting mirror 20 goes through a through hole 11 in the concave mirror 10 and becomes incident to the polygon mirror 40 positioned near the center of the drawing.

The polygon mirror 40 has a plurality of reflection faces, and more specifically, four reflection faces according to the embodiment. When being driven and rotated by a motor, the polygon mirror 40 scans the laser beam being incident thereto. The scan beam scanned by the polygon mirror 40 is reflected by the mirror system 73 so as to change its direction toward the upper side of the drawing, then becomes incident to the mirror system 72, and is further reflected by the mirror system 72 so as to change its direction toward the viewer side of the drawing, and then goes through the reading window 50 so as to be emitted to the outside of the barcode reader 100.

Although only one mirror is shown in the drawings for each of the mirror system 72 and the mirror system 73; however, the barcode reader 100 includes more mirrors that are not shown in the drawing so as to emit a plurality of scan beams.

The scan beam emitted from the barcode reader 100 is reflected diffusely by a barcode attached to an item passing near the reading window 50 disposed on the viewer side of the drawing, and the beams obtained as a result of the reflection (hereinafter, "the reflection beams") become incident again to the barcode reader 100 through the reading window 50.

The reflection beams being incident to the barcode reader 100 reach the polygon mirror 40 by following the same path as the emission path and are reflected by the polygon mirror 40 so as to become incident to the concave mirror 10 positioned near the center on the lower side of the drawing.

Figure 3:
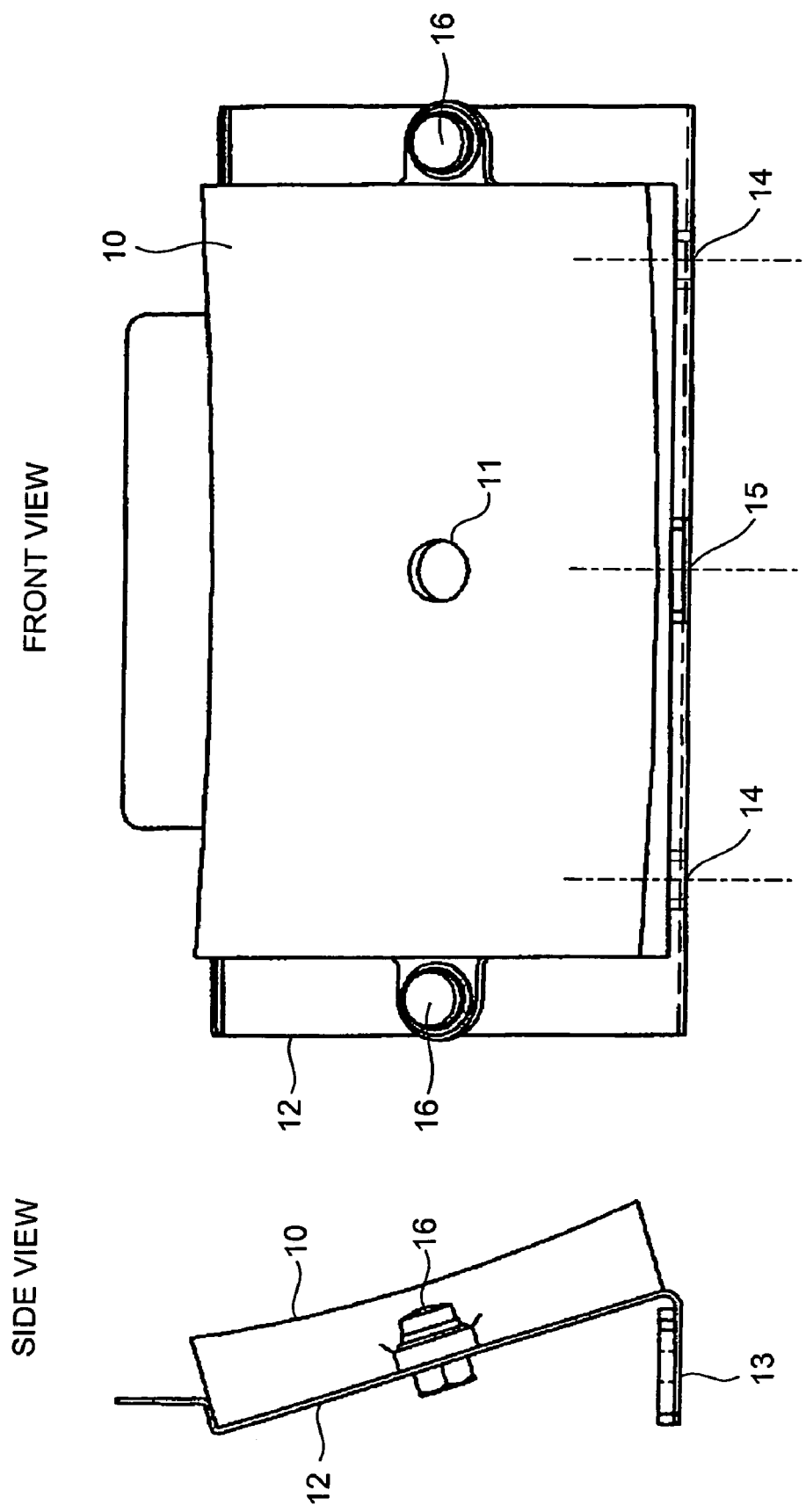
FIG. 3 is a drawing for explaining a concave mirror shown in FIG. 1.

The concave mirror 10 collects the reflection beams reflected by the polygon mirror 40 and introduces them to an optical detector 60. FIG. 3 is a drawing for explaining the concave mirror 10. FIG. 3 includes a front view and a side view of the concave mirror 10. As shown in the front view in the drawing, the concave mirror 10 has the through hole 11 near the center.

The concave mirror 10 is fixed by a concave mirror fixing screw 16 to the metal plate frame 12 used for attaching the concave mirror 10 to the casing of the barcode reader 100. The metal plate frame 12 is bent in an L-shape. The concave mirror 10 is biased toward the left side of the side view in the drawing by the resilience of the metal plate frame 12.

The folded portion 13 of the metal plate frame 12 has screw holes 14 near both edges. Also, at the middle point between these two screw holes 14, the folded portion 13 has another hole 15 that serves as a supporting point. The casing of the barcode reader 100 has two elongated holes extending in an up-and-down direction at metal plate frame attachment positions. Also, at the middle point between these two elongated holes, the casing of the barcode reader 100 has another screw hole.

The metal plate frame 12 to which the concave mirror 10 is attached has the hole 15, and the supporting member 21 supporting the laser beam deflecting mirror 20 is inserted and fitted into the hole 15, which serves as the supporting point. The metal plate frame 12 is attached to the casing of the barcode reader 100 by the screw portion 22 on the supporting member 21.

Figure 4:
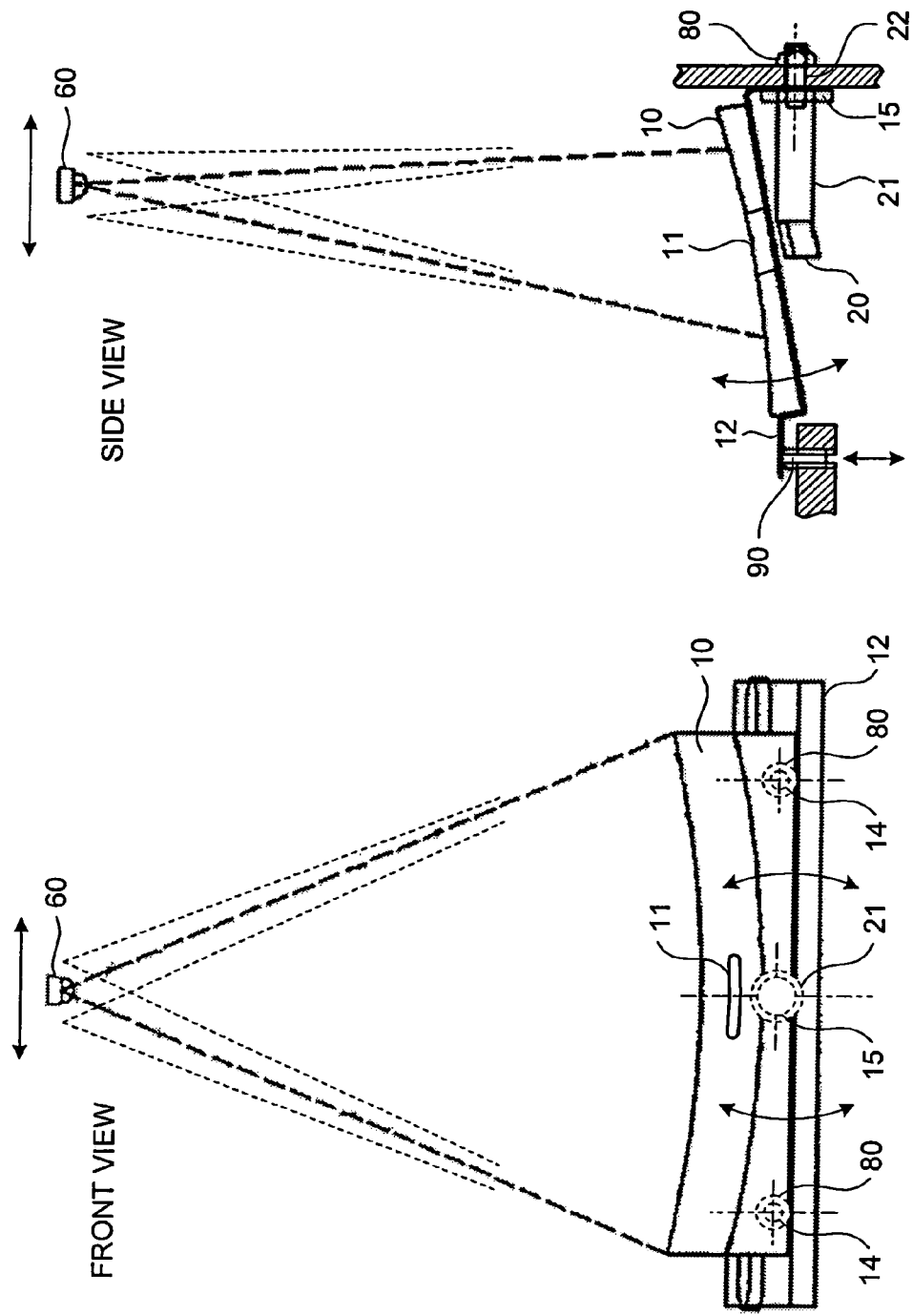
FIG. 4 is a drawing for explaining the adjustment of the angle of the concave mirror.
Figure 5A:
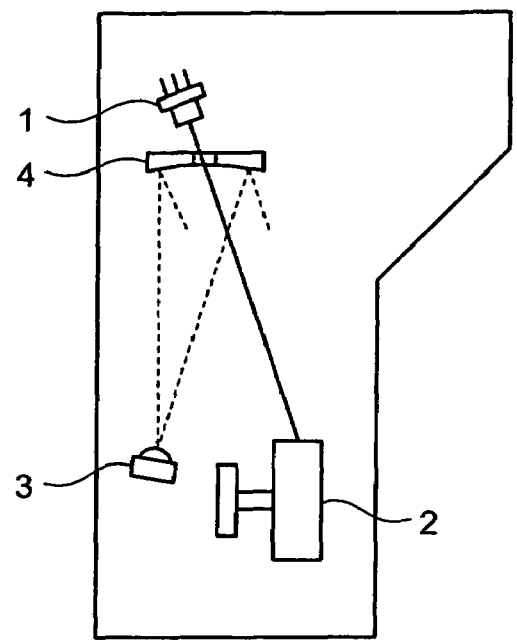
FIGS. 5A and 5B are drawings for explaining conventional barcode readers.
Figure 5B:
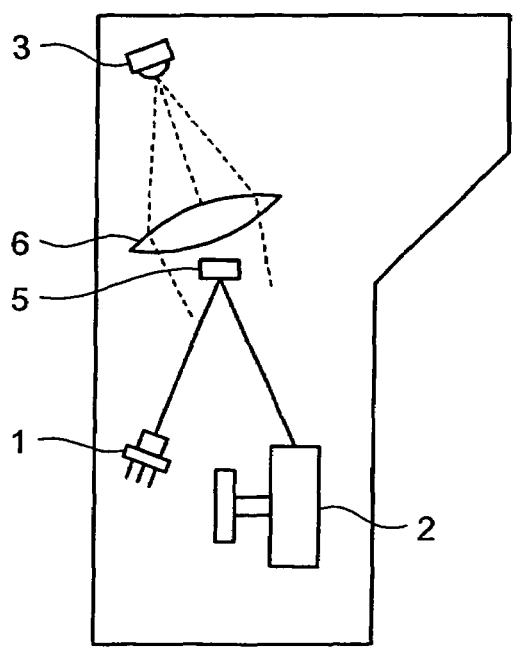

The concave mirror 10 attached to the casing of the barcode reader 100 in this manner is rotatable using the supporting member 21 as the rotation axis. FIG. 4 is a drawing of the adjustment of the angle of the concave mirror 10. The concave mirror 10 is rotatable using the supporting member 21 as the rotation axis, in the perpendicular direction shown in the front view in the drawing. Thus, it is possible to adjust the optical axis of the laser beam being incident to the optical detector 60 in the left-and-right direction of the drawing.

As described above, because the concave mirror 10 is rotatable using the supporting member 21 as the rotation axis, it is possible to adjust the optical axis of the laser beam introduced to the optical detector 60 so as to be in the same direction as the scan direction of the laser beam scanned by the polygon mirror 40. It is therefore possible to correct, within the barcode reader 100, an error that may occur during the assembly process of the optical system.

Further, because the supporting member 21 is in the shape of a cylindrical column, the concave mirror 10 is able to rotate smoothly. Thus, it is possible to adjust the angle of the optical axis of the laser beam with a high degree of precision.

After the adjustment is made so that the focal point of the laser beam is positioned on the optical detector 60, the concave mirror 10 is fixed by screwing the screw holes 14 in the folded portion 13 of the metal plate frame 12 together with the elongated holes in the casing of the barcode reader 100, using attachment screws 80.

As described here, by fixing, with the screws, the metal plate frame 12 to which the concave mirror 10 has been attached, it is possible to maintain the focal point of the laser beam on the optical detector 60.

In addition, as shown in the side view in the drawing, the concave mirror 10 is biased toward the lower side of the drawing by the resilience of the metal plate frame 12. And as shown in the side view in the drawing, the concave mirror 10 rotates in the perpendicular direction, using the folded portion 13 of the metal plate frame 12 as the central axis. It is therefore possible to adjust, in the left-and-right direction of the drawing (i.e. in the front-and-back direction in the front view), the optical axis of the laser beam being incident to the optical detector 60, depending on how much an adjustment screw 90 is screwed out from the casing of the barcode reader 100.

As described so far, by rotating the concave mirror 10 using the folded portion 13 of the metal plate frame 12 as the central axis, it is possible to adjust the optical axis of the laser beam introduced to the optical detector 60 in the direction perpendicular to the scan direction of the laser beam scanned by the polygon mirror 40. Thus, it is possible to correct, within the barcode reader 100, an error that may occur during the assembly process of the optical system.

The laser beam that has become incident to the optical detector 60 due to the concave mirror 10 is converted to an electric signal and is further demodulated by a demodulating circuit, so that the identification information can be read.

As explained so far, according to the embodiment, an arrangement is made in which the concave mirror 10 that introduces the reflection beams reflected by a barcode to the optical detector 60 is rotatable, and the supporting member 21 supporting the laser beam deflecting mirror 20 that deflects the laser beam emitted from the laser light source module 30 toward the polygon mirror 40 also serves as the rotation axis of the concave mirror 10. It is therefore possible to dispose the laser beam deflecting mirror 20 at such a position that the laser beam being incident to the concave mirror 10 is not interrupted by the laser beam deflecting mirror 20. Thus, it is possible to make the barcode reader 100 smaller in size without lowering the level of the reading performance.

In the embodiment, an example in which the present invention is applied to a barcode reader having one reading window has been explained; however, the present invention is not limited to this example. It is acceptable to apply the present invention to a barcode reader that has a plurality of reading windows.

According to the present invention, an arrangement is made in which the light collecting unit that introduces the reflection beam reflected by an item to the optical detecting unit is rotatable and the supporting member supporting the optical deflecting unit that deflects the light beam emitted from the light source toward the optical scanning unit also serves as the rotation axis of the light collecting unit. It is therefore possible to dispose the optical deflecting unit at such a position that the light beam being incident to the light collecting unit is not interrupted by the optical deflecting unit. Thus, an effect is achieved where it is possible to make the reading apparatus smaller without lowering its reading performance.

According to the present invention, the light beam emitted from the light source is deflected toward the optical scanning unit by a mirror. By rotating the supporting member, it is possible to adjust the mirror so as to be tilted at a predetermined angle with respect to the optical axis of the light beam being incident to the optical scanning unit. Thus, an effect is achieved where it is possible to adjust the focal point of the light beam and to correct, within the reading apparatus, an error that may occur during the assembly process of the optical system.

According to the present invention, the light colleting unit rotates in the same direction as the scan direction of the light beam scanned by the optical scanning unit. It is therefore possible to adjust the optical axis of the light beam introduced to the optical detecting unit so as to be in the same direction as the scan direction of the light beam scanned by the optical scanning unit. Thus, an effect is achieved where it is possible to correct, within the reading apparatus, an error that may occur during the assembly process of the optical system.

According to the present invention, the light collecting unit rotates in a direction perpendicular to the scan direction of the light beam scanned by the optical scanning unit. It is therefore possible to adjust the optical axis of the light beam introduced to the optical detecting unit so as to be in a direction perpendicular to the scan direction of the light beam scanned by the optical scanning unit. Thus, an effect is achieved where it is possible to correct, within the reading apparatus, an error that may occur during the assembly process of the optical system.

According to the present invention, an arrangement is made in which the reflection beam reflected by an item is introduced to the optical detecting unit by the concave mirror supported by the metal plate frame having an opening, and the concave mirror is rotatable using the supporting member that supports the optical deflecting unit as the rotation axis, the supporting member being inserted and fitted into the opening. It is therefore possible to dispose the optical deflecting unit at such a position that the light beam being incident to the concave mirror is not interrupted by the optical deflecting unit. Thus, an effect is achieved where it is possible to make the reading apparatus smaller in size without lowering the level of the reading performance.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A reading apparatus that reads identification information attached on an object located outside of the reading apparatus by optically scanning a surface of the object, the reading apparatus comprising:
    a light source configured to output a light beam;
    an optical deflecting unit configured to deflect the light beam;
    an optical scanning unit that receives the light beam from the optical deflecting unit, produces a scan beam from light beam, and emits the scan beam toward the object;
    a light collecting unit that collects a reflection beam that is a light reflected from the surface of the object;
    a supporting member that supports the optical deflecting unit and that rotatably supports the light collecting unit; and
    an optical detecting unit that receives the reflection beam from the light collecting unit so as to detect a barcode attached to the surface of the object,
    wherein said light collecting unit is rotatable to adjust a focal point of the reflection beam to be on the optical detecting unit, and
    wherein said optical deflecting unit is positioned behind all of said light collecting unit, with respect to said optical scanning unit.

2. The reading apparatus according to claim 1, wherein the optical deflecting unit is a mirror and has a deflecting angle which is adjustable relative to an optical axis of the light source by rotating said supporting member that has the same rotation axis as the light collecting unit.

3. The reading apparatus according to claim 1, wherein one of rotation directions of the light collecting unit is same as a scan direction of the scan beam.

4. The reading apparatus according to claim 1, wherein one of the rotation directions of the light collecting unit is perpendicular to a scan direction of the scan beam.

5. The reading apparatus according to claim 1, wherein the light collecting unit is configured to include a concave mirror supported by a metal plate frame having an opening, and the supporting member rotatably supports the light collecting unit by being inserted and fitted into the opening.

6. The reading apparatus according to claim 5, further comprising a second supporting member that supports the metal plate frame; and a screw that fixes the second supporting member to a frame.

7. The reading apparatus according to claim 1, further comprising a screw that fixes the supporting member to a frame.

8. The reading apparatus according to claim 1, wherein the supporting member is in a shape of a cylindrical column.

9. The reading apparatus according to claim 8, further comprising a metal plate frame attached to said light collecting unit,
    wherein said supporting member has a first end on which said optical deflecting unit is fixed, and a second end having a screw portion,
    wherein said metal plate frame has a hole through which said screw portion is inserted to engage said metal plate frame attached to said light collecting unit with said supporting member, and
    wherein said screw portion is screwed to a casing of the reading apparatus so that said supporting member engaged with said metal plate frame is rotatably fixed to said casing.

10. The reading apparatus according to claim 9, wherein said metal plate frame has a first bent section at a first end of said metal plate at which the hole is located, and a second bent section on a second end of said metal plate that is screwed to said casing.

11. The reading apparatus according to claim 1, further comprising a metal plate frame attached to said light collecting unit,
    wherein said supporting member has a first end on which said optical deflecting unit is fixed, and a second end having a screw portion,
    wherein said metal plate frame has a hole through which said screw portion is inserted to engage said metal plate frame attached to said light collecting unit with said supporting member, and
    wherein said screw portion is screwed to a casing of the reading apparatus so that said supporting member engaged with said metal plate frame is rotatably fixed to said casing.

12. The reading apparatus according to claim 11, wherein said metal plate frame has a first bent section at a first end of said metal plate at which the hole is located, and a second bent section on a second end of said metal plate that is screwed to said casing.

13. A reading apparatus that reads identification information attached on an object located outside of the reading apparatus by optically scanning a surface of the object, the reading apparatus comprising:
    a light source configured to output a light beam;
    an optical deflecting unit configured to deflect the light beam;
    an optical scanning unit that receives the light beam from the optical deflecting unit, produces a scan beam from light beam, and emits the scan beam toward the object;
    a light collecting unit that collects a reflection beam that is a light reflected from the surface of the object;
    a supporting member that supports the optical deflecting unit and that rotatably supports the light collecting unit; and
    an optical detecting unit that receives the reflection beam from the light collecting unit so as to detect a barcode attached to the surface of the object,
    wherein said light collecting unit is rotatable on an axis that is substantially perpendicular to a line connecting the optical detecting unit and a center portion of a reflection surface of the light collecting unit, so as to adjust the reflected beam direction, and
    wherein said optical deflecting unit is positioned behind all of said light collecting unit, with respect to said optical scanning unit.

14. The reading apparatus according to claim 13, wherein the optical deflecting unit is a mirror and has a deflecting angle which is adjustable relative to an optical axis of the light source by rotating said supporting member that has the same rotation axis as the light collecting unit.

15. The reading apparatus according to claim 13, wherein one of rotation directions of the light collecting unit is same as a scan direction of the scan beam.

16. The reading apparatus according to claim 13, wherein one of the rotation directions of the light collecting unit is perpendicular to a scan direction of the scan beam.

17. The reading apparatus according to claim 13, wherein the light collecting unit is configured to include a concave mirror supported by a metal plate frame having an opening, and the supporting member rotatably supports the light collecting unit by being inserted and fitted into the opening.

18. The reading apparatus according to claim 17, further comprising a second supporting member that supports the metal plate frame; and a screw that fixes the second supporting member to a frame.

19. The reading apparatus according to claim 13, further comprising a screw that fixes the supporting member to a frame.

20. The reading apparatus according to claim 13, wherein the supporting member is in a shape of a cylindrical column.

* * * * *